April 21, 1931.  C. C. FARMER  1,801,855
FLUID PRESSURE BRAKE
Filed June 1, 1929
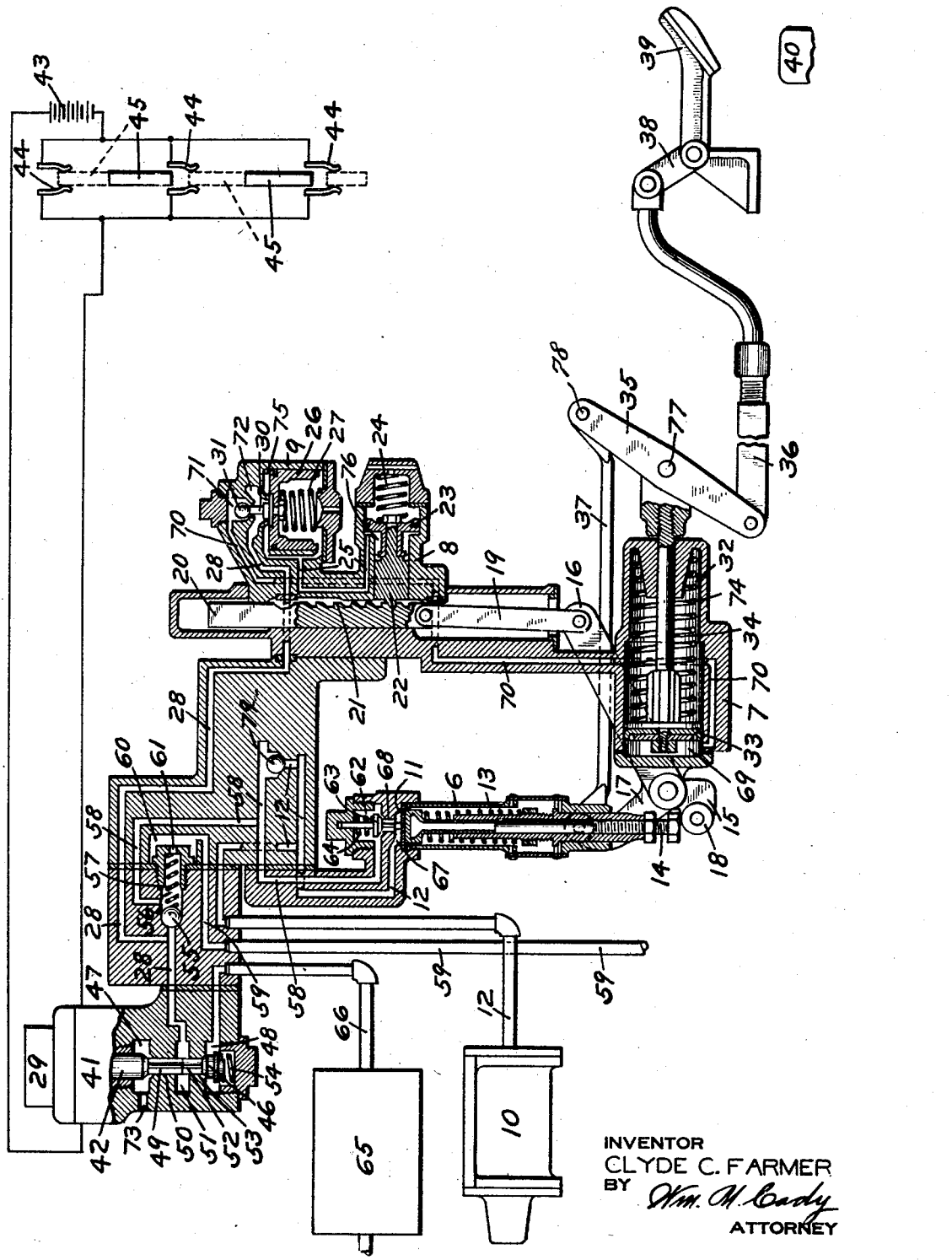
INVENTOR
CLYDE C. FARMER
BY
Wm. W. Cady
ATTORNEY Patented Apr. 21, 1931

1,801,855

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID-PRESSURE BRAKE

Application filed June 1, 1929. Serial No. 367,793.

This invention relates to fluid pressure brakes and more particularly to a brake and door interlock.

An object of the invention is to provide improved means for preventing the release of the brakes when the doors of a car are open.

Another object of the invention is to provide a fluid pressure brake equipment in which the brakes can be applied through pneumatically actuated means at any time, and in which the brakes are automatically applied by electrically operated means when a car door is moved to open position.

Another object of the invention is to provide a fluid pressure brake equipment having a double check valve device by which communication is normally established through which fluid may be supplied to the brake cylinder by pneumatic means, and with which is combined electrically controlled means which may be operated by the operation of a car door for supplying fluid to the brake cylinder, the check valve device being operated by the flow of fluid from the electrically controlled means to open communication from the electrically controlled means to the brake cylinder.

Another object of the invention is to provide an improved fluid pressure brake equipment of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic view, mainly in section, of a fluid pressure brake equipment embodying the invention.

It has heretofore been proposed to provide a load regulated brake equipment having means adapted to be adjusted so as to regulate the braking power according to the load on the car and including a spring adapted to be compressed in proportion as the load is increased. In order to lock the spring so that it will remain in its adjusted position while the car is running, a locking device is provided.

When a load regulated brake equipment of the above type is combined with an electrically controlled safety car control equipment, it is of advantage to provide means by which the change over from the pneumatically operated brake application means to the electrically controlled means will be automatically effected.

By the present invention a fluid pressure brake equipment is provided in which the brakes may be applied by pneumatic means in the usual manner, and in which electrically operated means are provided for effecting the application of the brakes independently of the pneumatic means when a car door is moved to open position and also for preventing the release of the brakes while a car door is in open position. Included in the equipment is a valve device normally establishing communication through which fluid is supplied to the brake cylinder by the pneumatic means, and operated by the flow of fluid from the electrically controlled means to open communication through which fluid is supplied to the brake cylinder through the electrically controlled means, and the load regulated mechanism is brought into action.

Referring to the drawing, the equipment may comprise a brake cylinder pressure limiting valve device 6, a device 7 for regulating the valve device 6 according to the load, locking mechanism 8 for the valve regulating device 7, a device 9 for controlling the operation of the valve regulating device 7 and the locking mechanism 8, and a brake cylinder 10.

The brake cylinder pressure limiting valve device 6 may comprise a flexible diaphragm 11, which is subject on one side to the pressure of fluid in the brake cylinder 10, as supplied through passage and pipe 12, and on the opposite side to the pressure of a coil spring 13.

A plunger 14 engaging the free end of the spring 13 is provided in order to vary the pressure exerted by said spring.

Pivotally mounted on the cap of the valve regulating device 7 is a crank arm member having crank arms 15, 16 and 17.

A roller 18 pivotally mounted on the crank arm 15 is adapted to engage one end of the plunger 14 for effecting an adjustment of the spring 13, according to the load on the car.

The crank arm 16 is connected by a link 19 to a ratchet bar 20, which is slidably mounted in the casing of the locking mechanism 8. The teeth 21 of the ratchet bar 20 are engageable by a pawl 22, which is operatively connected to a piston 23. The piston 23 is subject on one side to the pressure of a spring 24 and on the opposite side to the pressure of fluid as supplied through a passage 25 from the control device 9.

The control device 9 may comprise a valve piston 26 subject on one side to the pressure of a spring 27 and on the inner seated area of the opposite side to the pressure of fluid in passage 28, leading to a magnet valve device 29.

Secured to the seating face of the valve piston 26 is a stem member 30, which engages a ball check valve 31 and is adapted when the valve piston 26 is held seated by the spring 27 to hold the ball check 31 from its seat.

The valve regulating device 7 may comprise a strut cylinder 32 containing a piston 33, the stem 34 of which is pivotally connected to a lever 35.

The lever 35 is pivotally connected at one end to a rod 36, and at the other end to a rod 37, which in turn is pivotally connected to the crank arm 17.

The outer end of the rod 36 is pivotally connected to one arm 38 of a bell crank which is mounted on the car body. The other arm 39 of the bell crank is adapted upon outward movement of the rod 36 to engage a member 40 mounted on the car truck.

The magnet valve device 29 may comprise a magnet 41 and valves 42 and 46 adapted to be operated by said magnet. The magnet 41 is connected in a circuit including a source of current 43 and including a plurality of switches 44, each controlled by the opening and closing of a plurality of car doors 45, so that when any one or all of the car doors are opened, the magnet circuit will be closed and when all of the car doors have been closed, the circuit will be open.

The valve 42 of the magnet valve device 29 is contained in a chamber 47, while the valve 46 is contained in a chamber 48. The valve 42 has a fluted stem 49 extending through a suitable bore 50 in the casing and engaging, in a chamber 51, a fluted stem 52 of the valve 46. The fluted stem 52 is mounted in a suitable bore 53 formed in the casing between chambers 48 and 51. A spring 54, contained in chamber 48 acts on the valve 46, tending to seat the same and unseat the valve 42. Passage 28, heretofore referred to, is connected to chamber 51.

A ball check valve 55, mounted in a chamber 56 and subject on one side to the pressure of a spring 57, is adapted in one position to open communication from passage 28 to a passage 58 leading from chamber 56, and in another position to open communication from the brake application pipe and passage 59 to passage 58, through chamber 60, port 61, and chamber 56.

The pipe 59 is connected to a brake application and release valve device (not shown), such as the usual triple valve device, so that when the triple valve device is operated in the usual manner to effect an application of the brakes, fluid under pressure is supplied by the application valve device to the pipe 59.

The pipe 59 may also be the pipe connection from an emergency valve device, through which fluid under pressure is supplied from a straight air pipe to the brake cylinder, by operation of a brake valve device, such as disclosed in United States Letters Patent No. 1,265,006, granted May 7, 1918, on an application filed by Walter V. Turner, for improvements in fluid pressure brakes.

Passage 58 is connected to a chamber 62 containing a valve 63 subject on one side to the pressure of a spring 64, and adapted to be operated by the diaphragm 11 heretofore referred to.

The main reservoir 65 or other source of fluid under pressure is connected by a pipe and passage 66 to chamber 48 of the magnet valve device 29.

In operation, when the car is running along the road, the brake cylinder 10 will be vented to the atmosphere through pipe and passage 12, past ball check valve 79, passage 58, chamber 56, port 61, chamber 60, and passage and pipe 59, the pipe 59 being connected to the atmosphere through the application valve device (not shown), when the brakes are released.

Since the diaphragm chamber 67 is in communication with passage 58, through bore 68, past unseated valve 63, and chamber 62, said diaphragm chamber will also be vented to the atmosphere.

The purpose of passage 58 containing the ball check valve 79 is to provide a by-pass through which the fluid under pressure in the brake cylinder 10 can be quickly released, so as to insure the release of the brakes without the necessity of the fluid released from the brake cylinder flowing through the chamber 67 of the pressure limiting valve device 6.

With all of the car doors 45 in closed position, as shown in full lines, the magnet circuit will be open and the magnet 41 will be deenergized. Deenergization of the magnet permits the spring 54 to shift the valve 46 to its upper position, in which the valve 42 will be unseated.

With the valve 42 unseated, piston chamber 69 of the valve regulating device 7, will be vented to the atmosphere through passage 70, chamber 71, past unseated ball check valve 31, chamber 72, passage 28, chamber 51, bore 50, chamber 47, and atmospheric exhaust port 73. There being no fluid pressure acting on piston 33, the spring 74 acts to force the piston 33 to the left. The bell crank at the outer end of rod 36 will then be operated so that the free arm 39 thereof will be moved away from the member 40. Movement of the car truck will thus not be transmitted to the bell crank while the car is running.

When the car is brought to a stop, as soon as one of the car doors 45 is moved to the open position, the magnet circuit will be closed and the magnet 41 energized. The energization of the magnet 41 seats the valve 42 and unseats the valve 46, and the fluid under pressure in the main reservoir 65 is permitted to flow to the brake cylinder 10 and to piston chamber 69 of the valve regulating device 7.

The fluid flows to the brake cylinder 10 from the reservoir 65, through pipe and passage 66, chamber 48, past unseated valve 46, bore 53, chamber 51, passage 28, forcing ball check valve 55 to its seat at the right end of chamber 56 so as to establish communication from passage 28 to passage 58, through which the fluid flows to chamber 62 of the brake cylinder pressure limiting valve device 6, and thence past unseated valve 63, through bore 68, chamber 67, and passage and pipe 12 to the brake cylinder.

At the same time that fluid is being supplied to the brake cylinder 10 from the main reservoir 65, fluid flows through passage 28 to chamber 72, building up a pressure against the inner seated area of the valve piston 26.

Inasmuch as the check valve 31 is unseated, because the spring 27, acting on the valve piston 26 forces the same upwardly to its seat, fluid from chamber 72 flows past ball check valve 31 to passage 70 and thence to the piston chamber 69 of the regulating device 7.

The fluid under pressure, building up in chamber 69, forces the piston 33 outwardly against the pressure exerted by spring 74. The pawl 22 being held in engagement with the teeth 21 of ratchet bar 20, by the spring 24, the crank arms 15, 16 and 17 are held against movement, so that the pivot pin 78 will act as a fulcrum for the lever 35, and the outward movement of piston 33 will push the rod 36 so as to bring crank arm 39 into engagement with the member 40.

The pressure of fluid supplied to piston chamber 69 acts on the inner seated area of the valve piston 26, and the spring 27 is of such resistance as to hold said valve piston seated, against the pressure of fluid acting on the inner seated area thereof, until the pressure of fluid in chamber 69 of the strut cylinder 32 has built up sufficiently to move the piston 33 outwardly, at which time said valve piston will be unseated against the pressure exerted by the spring 27.

The downward movement of the valve piston 26 away from its seat, permits the ball check valve 31 to seat, thereby preventing back flow of fluid from chamber 69 and at the same time opening communication from passage 28 through passage 25 to chamber 76 at the inner side of piston 23. The fluid under pressure supplied from passage 28 acting on piston 23 moves said piston to the right against the pressure exerted by the spring 24 so as to disengage the pawl 22 from the teeth 21 of ratchet bar 20.

If the load on the car is now increased, the car springs will be compressed, so that the member 40 acting on the arm 39 will cause a counter-clockwise movement of the bell crank, which exerts a force through the rod 36 to cause a clockwise rotation of the lever 35, with the pivot pin 77 acting as a fulcrum. The rod 37 then acts to rotate crank arm 17 so as to rock the crank arm 15 in a clockwise direction, forcing the plunger 14 upwardly to compress the spring 13 correspondingly with the increase in load. The movement of the rod 37 as above referred to also effects the rotation of the crank arm 16, so that the link 19 is operated to shift the ratchet bar 20 to a position corresponding with the adjusted position of the plunger 14.

When the car has been loaded and the car doors are closed, the magnet 41 will be deenergized, and the spring 54, acting on the valve 46, seats said valve and unseats the valve 42.

With the valve 42 unseated, piston chamber 76 of the locking mechanism 8, will be vented to the atmosphere through passage 25, chamber 75, past the stem member 30, chamber 72, passage 28, chamber 51, bore 50, chamber 47, and atmospheric exhaust port 73. The reduction of fluid pressure in chamber 76, permits the spring 24 to force the piston 23 to the left and cause pawl 22 to engage the teeth of the ratchet bar 20.

The reduction of fluid pressure in chamber 75 will be sufficient to permit the spring 27 to force the valve piston 26 upwardly, thereby unseating ball check valve 31 and permitting fluid from chamber 69 of the strut cylinder 32 to flow to atmosphere by way of passage 70, chambers 72 and 71, and the passage 28, as has been described. The piston 33 is then shifted by the pressure exerted by spring 74 to its retracted position, in which the arm 39 of the bell crank is moved out of engagement with the member 40, for the purpose hereinbefore described.

It will now be seen that the piston 33 is maintained in its outermost position until after the piston 23 has moved to the left, causing pawl 22 to engage the teeth 21 of the ratchet bar 20, thereby locking the mechanism in adjusted position.

When an application of the brakes is being effected, fluid under pressure will be supplied to the brake cylinder 10 through pipe and passage 59, chamber 60, port 61, chamber 56, passage 58, chamber 62, bore 68 past unseated valve 63, to diaphragm chamber 67 and from thence through passage and pipe 12, to the brake cylinder. Ball check 55 will be held seated at the left end of chamber 56 by the combined pressures of spring 57 and the brake pipe fluid, thereby cutting off communication to the passage 28.

The pressure supplied to chamber 67 acts on the diaphragm 11, and when the pressure in the brake cylinder has been increased to a predetermined degree, corresponding with the previous adjustment of spring 13 in accordance with the load on the car, the diaphragm 11 will be moved, permitting the valve 63 to be seated by spring 64, thereby cutting off the further supply of fluid to the brake cylinder.

The brakes may be released when the pipe 59 is connected to the atmosphere, fluid being exhausted from the brake cylinder 10 and the chamber 67 past the check valve 79, through passage 58, chamber 56, port 61, chamber 60, and then through pipe 59.

If, while the car is running along the road, a car door 45 is moved to open position, the magnet circuit will be closed and the magnet 41 energized, thereby initiating an application of the brakes in the following manner:

The energization of the magnet 41 seats the valve 42 and unseats the valve 46, and the fluid under pressure in the main reservoir 65 is permitted to flow to the brake cylinder 10, through pipe and passage 66, chamber 48, past unseated valve 46, bore 53, chamber 51, passage 28, forcing ball check 55 to its seat at the right end of chamber 56 so as to establish communication with passage 58, through which the fluid flows to chamber 62 of the brake cylinder pressure limiting valve device 6, and thence past unseated valve 63, through bore 68, chamber 67 and passage and pipe 12.

It is to be noted that the brakes can not be released when a car door 45 is open, and if for any reason a car door is moved to open position when the brakes are released, then the brakes will be applied, because in either case, the magnet 41 will be energized and therefore a communication will be established whereby the brake cylinder is supplied with fluid under pressure from the main reservoir 65, as has just been described.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder, a pipe through which fluid is supplied to the brake cylinder by pneumatic means, electrically controlled means for supplying fluid to the brake cylinder, means for controlling the flow of fluid from said pipe and said electrically controlled means to the brake cylinder, and means controlled by the operation of a car door for controlling said electrically controlled means.

2. In a fluid pressure brake, the combination with a brake cylinder, a pipe through which fluid is supplied to the brake cylinder by pneumatic means, electrically controlled means for supplying fluid to the brake cylinder, a double check valve for controlling the flow of fluid from said pipe and said electrically controlled means to the brake cylinder, and means controlled by the operation of a car door for controlling said electrically controlled means.

3. In a fluid pressure brake, the combination with a brake cylinder, a pipe through which fluid is supplied to the brake cylinder by pneumatic means, electrically controlled means for supplying fluid to the brake cylinder, means for controlling the flow of fluid from said pipe and said electrically controlled means to the brake cylinder, mechanism for varying the pressure of fluid supplied to the brake cylinder according to the load on the car, and means controlled by said electrically controlled means for cutting said mechanism into action.

4. In a fluid pressure brake, the combination with a brake cylinder, a pipe through which fluid is supplied to the brake cylinder by pneumatic means, electrically controlled means for supplying fluid to the brake cylinder, means for controlling the flow of fluid from said pipe and said electrically controlled means to the brake cylinder, means controlled by the operation of a car door for controlling said electrically controlled means, and mechanism for varying the pressure of fluid supplied to the brake cylinder according to the load on the car.

5. In a fluid pressure brake, the combination with a brake cylinder, a pipe through which fluid is supplied to the brake cylinder by pneumatic means, electrically controlled means for supplying fluid to the brake cylinder, means for controlling the flow of fluid from said pipe and said electrically controlled means to the brake cylinder, means controlled by the operation of a car door for controlling said electrically controlled means, mechanism for varying the pressure of fluid supplied to the brake cylinder according to the load on the car, and means controlled by said electrically controlled means for cutting said mechanism into action.

6. In a fluid pressure brake, the combination with a brake cylinder, a pipe through which fluid is supplied to the brake cylinder by pneumatic means, electrically controlled means for supplying fluid to the brake cylinder, a double check valve for controlling the flow of fluid from said pipe and said electrically controlled means to the brake cylinder, means controlled by the operation of a car door for controlling said electrically controlled means, mechanism for varying the pressure of fluid supplied to the brake cylinder according to the load on the car, and means controlled by said electrically controlled means for cutting said mechanism into action.

7. In a fluid pressure brake, the combination with a brake cylinder, of mechanism for varying the pressure of fluid supplied to the brake cylinder according to the load on the car, valve means normally establishing communication through which fluid is supplied to the brake cylinder by pneumatic means, electrically controlled means for supplying fluid to the brake cylinder, said valve means being operated by the flow of fluid from said electrically controlled means to open communication from said electrically controlled means to the brake cylinder, and means controlled by said electrically controlled means for cutting said pressure varying mechanism into action.

8. In a fluid pressure brake, the combination with a brake cylinder, of mechanism for varying the pressure of fluid supplied to the brake cylinder according to the load on the car, a valve device normally establishing communication through which fluid is supplied to the brake cylinder by pneumatic means, electrically controlled means for supplying fluid to the brake cylinder, said valve device being operated by the flow of fluid from said electrically controlled means to open communication from said electrically controlled means to the brake cylinder, means controlled by said electrically controlled means for cutting said pressure varying mechanism into action, and means controlled by the operation of a car door for controlling said electrically controlled means.

9. In a fluid pressure brake, the combination with a brake cylinder, means adjustable according to the load on the car for regulating the braking power, a locking device for locking said means in an adjusted position and operated by fluid under pressure to release position, a piston operated by fluid under pressure for operatively connecting said means so as to be controlled according to the load on the car, means operated by fluid supplied to said piston for controlling the supply of fluid to said locking device, a double check valve normally establishing communication through which fluid is supplied to the brake cylinder by pneumatic means, and electrically controlled means operated by the operation of a car door for supplying fluid to the brake cylinder and also to said locking device, said piston, and said locking device control means, said check valve being operated by the flow of fluid from said electrically controlled means to open communication from said electrically controlled means to the brake cylinder.

In testimony whereof I have hereunto set my hand this 14th day of May, 1929.

CLYDE C. FARMER.